United States Patent [19]

Reffell

[11] E Re. 29,024

[45] Reissued Nov. 2, 1976

[54] PARACHUTE

[75] Inventor: Brian Richard Arnold Reffell, Southall, England

[73] Assignee: The Walter Kidde & Company, Inc., Belleville, N.J.

[22] Filed: Feb. 12, 1974

[21] Appl. No.: 441,833

Related U.S. Patent Documents

Reissue of:

[64] Patent No.: 3,167,279
Issued: Jan. 26, 1965
Appl. No.: 294,719
Filed: July 12, 1963

[30] Foreign Application Priority Data

July 20, 1962 United Kingdom ..... 28076/62
Nov. 20, 1962 United Kingdom ..... 43901/62

[52] U.S. Cl. ..... 244/145
[51] Int. Cl.[2] ..... B64D 17/02

[58] Field of Search ..... 244/138–152; 114/209

[56] References Cited

UNITED STATES PATENTS

| | | | |
|---|---|---|---|
| 1,509,410 | 9/1924 | Ruff | 244/142 |
| 1,644,251 | 10/1927 | Hawes | 244/145 |
| 1,877,227 | 9/1932 | Cunningham | 244/142 |
| 2,367,244 | 1/1945 | Switlik | 244/145 |

FOREIGN PATENTS OR APPLICATIONS

| | | | |
|---|---|---|---|
| 1,094,528 | 5/1955 | France | 244/142 |

*Primary Examiner*—Stephen G. Kunin
*Attorney, Agent, or Firm*—Darby & Darby

[57] ABSTRACT

*A parachute for use in descents over water having upwardly facing pockets some of which fill with water as the parachute is dragged over the water to aid in the deflation of the parachute.*

2 Claims, 4 Drawing Figures

1
2
3
4
5
6
7

PARACHUTE

Matter enclosed in heavy brackets [ ] appears in the original patent but forms no part of this reissue specification; matter printed in italics indicates the additions made by reissue.

The present invention relates to parachutes intended to support either persons or articles which may drop into water.

The parachute of the present invention has been designed principally for the use of an airman who is provided with a collapsible dinghy which is automatically supplied with gas from a pressure source on immersion in water, so as to unroll and unfold the dinghy as described in United States Letters Pat. No. 3,080,582 and in application Ser. No. 179,271, Pat. No. 3,125,770, and to inflate its buoyancy tube. The parachute of the present invention may, however, be used quite generally with advantage by any airman who may descend by parachute to alight in the water.

The pack for an inflatable dinghy is usually strapped under the seat of the airman. The whole operation of the automatically inflated dinghy of the type above referred to is initiated by a water sensitive element which, on immersion in water, has the effect of releasing a gas charge from a storage container. If the airman is in a disabled condition on alighting in the water it is possible that the drag of the wind on the parachute will pull him over onto his face and even submerge him, in high wind conditions, and thus the dinghy system may function with the man underneath the dinghy instead of seated in it. In order to overcome this difficulty means must be provided for collapsing the parachute automatically so that the tension in the rigging lines is reduced, thus permitting the airman to come up to a more or less horizontal face-up position in the water, which he will readily do if he is also equipped with an automatically inflated lifejacket. When the dinghy functions with the airman in a horizontal face-up position, then there is little risk of malfunction.

It is, of course, hazardous for any man to be dragged into a face-down position in the water by a parachute irrespective of whether he is provided with an automatically inflatable dinghy.

When a man is being dragged through the water by the action of wind on a parachute, the bottom edge of the parachute canopy will touch the water and the movement of water relative to the parachute will, of course, be in the direction opposite to that of the wind.

According to the present invention in order to secure the rapid collapse of a parachute in water, the canopy of the parachute is provided with a series of upwardly facing pockets symmetrically arranged on its outer surface close to the peripheral edge of the canopy. The most simple way of achieving this result is to provide an upwardly and outwardly turned portion at the edge of each of the canopy gores. These portions are stitched to their gores in such a way as to leave an upwardly facing pocket between the panel and the upturned portion. The stitching of these pockets must be arranged so that the pockets open automatically when the parachute canopy is dragged over the water by the wind. The water will then have a braking effect on the movement of that part of the canopy which touches the water. This will have the effect of quickly dragging the whole canopy down into the water, because the braking effect will be quite marked at one edge, whereas there will be no braking effect on the opposite edge. The drogue effect of the canopy pockets at one edge of the canopy and the pull of the wind on the remainder tends to overturn the canopy and bring its crown down towards the water and thus to bring a greater part of the periphery of the canopy into the water. As more of the canopy is dragged into the water so more pockets will be brought into operation and the parachute will be completely collapsed into the water in a very short time.

In order to ensure that the pockets fill with water, the mouth of each pocket is preferably made slack and/or is provided with some form of ruffled edge to prevent the fabric of the pocket being flattened against the fabric of the canopy.

Furthermore, it may be found desirable to arrange that the mouths of adjacent pockets are at different distances from the edges of the canopy so as to make it more certain that a pocket is caught by the water as the bottom part of the canopy touches the water.

It is also found desirable to provide a series of downwardly facing pockets at the peripheral edge, in addition to the upwardly facing pockets. Such downwardly facing pockets provide additional resistance to movement of the canopy through the air and may be provided to aid the depolyment of the parachute from its packed condition. Such downwardly facing pockets can be formed from the same pieces of fabric as the upwardly facing pockets.

The invention is hereinafter described with reference to the accompanying drawings, in which:

FIG. 1 illustrates the danger encountered by an airman who has descended by parachute 1 into the water in windy conditions and is unable, for some reason, to release his parachute harness 2. A wind of quite moderate strength will pull him onto his face and he may drown quite quickly.

Figures 1, 2:
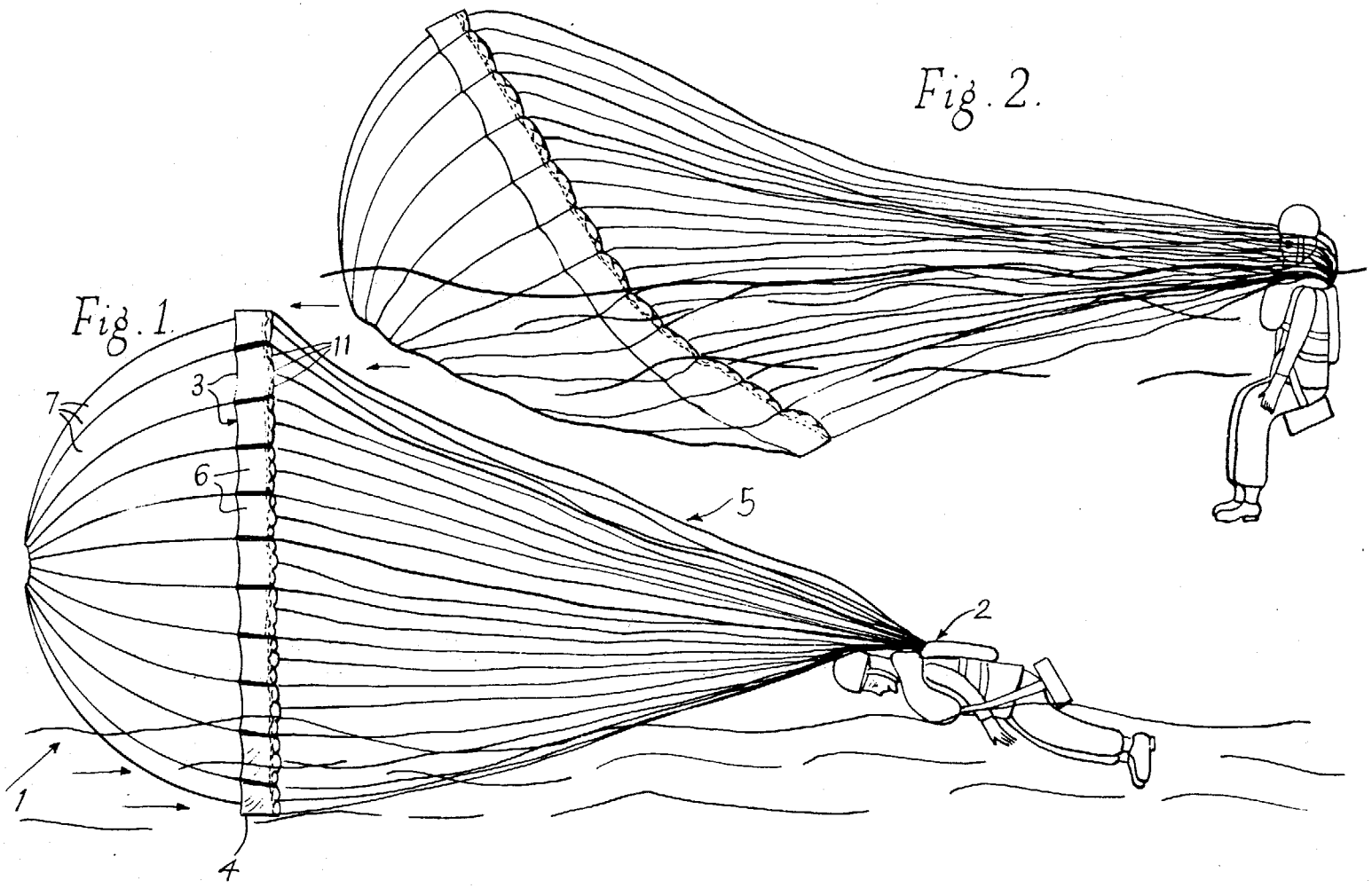
FIGS. 1 and 2 illustrate the operation of a parachute made in accordance with the invention.

If his parachute 1 is provided with a series of upwardly facing pockets 3 at or near the peripheral edge of the canopy 4, as provided by the present invention, such pockets 3 will quickly become filled with water, which, relative to the canopy, flows in the direction of the lower arrows. This immediately brings the speed of the lower edge of the canopy 4 through the water down to a very low rate. The upper part of the canopy however, continues to move forward as the result of the wind indicated by the upper arrows and the canopy 4 very rapidly moves towards the conditions shown in FIG. 2, followed by complete collapse onto the water. It will be appreciated that the tension goes off the canopy rigging lines 5 as soon as the wind is spilled out of the canopy 4.

Figure 3:
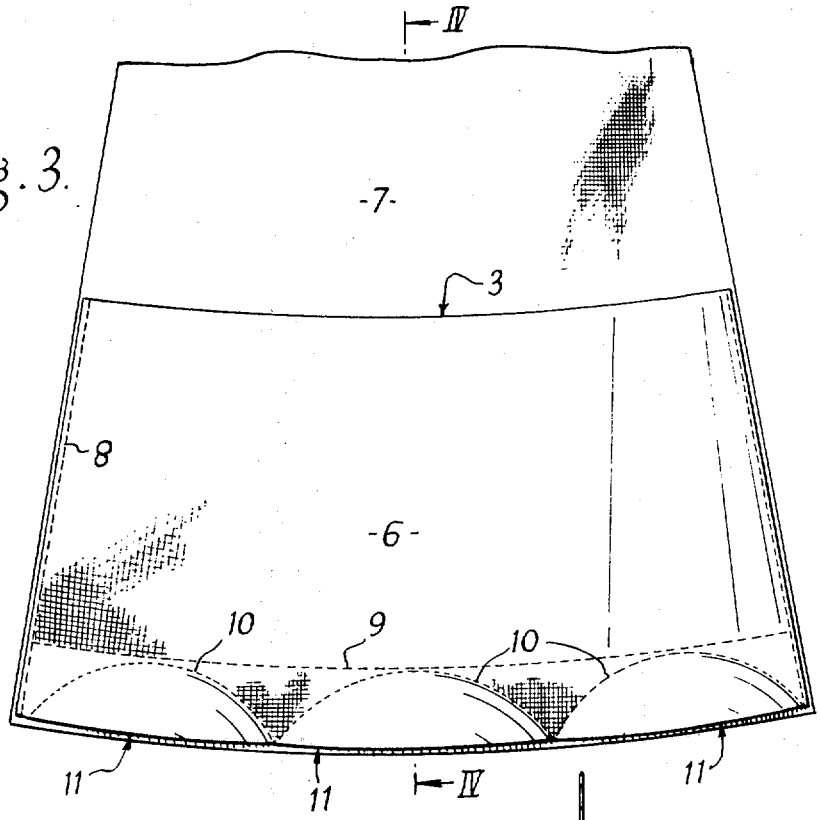
FIG. 3 is a front view of the lower end of a parachute canopy gore or panel and, FIG. 4 is a section of line IV—IV in FIG. 3.

The construction of the pockets 3 is shown in FIG. 3. To provide a pocket, a patch 6 is sewn to the outer end of each canopy gore 7. The patch 6 is stitched to the gore 7 along radial stitch lines 8, positioned near the side edges of the gore and along a stitch line 9, which forms the bottom of the pocket 3. If the patches 6 are incorporated during the original making of the parachute the edges of the patches 6 can be stitched directly into the seams between adjacent canopy gores 7.

Below the stitch line 9, which is substantially parallel with the bottom edge of the canopy gore 7 a further stitch line 10 is sewn so as to define three shallow downwardly facing pocket sections 11, which, as already explained, are provided for the purpose of increasing the resistance of the parachute to motion through the air and thus to increase the rate at which the parachute is deployed from its pack. The stitch line 10 comprises adjacent arcuate lengths.

Figure 4:
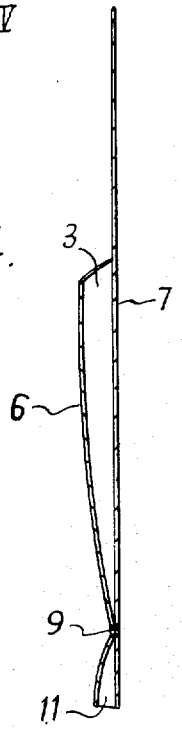

As will be seen from FIG. 4 each patch 6 is stitched to a canopy gore 7 in such manner as to ensure that the top and bottom edges of the patch between the stitch lines are slightly greater in length than the distance between the stitch lines as measured on the surface of the gore. The result is that the free edges of the patches 6 are slack when the parachute is in the folded condition, with the result that the pockets open freely.

As already suggested it may be desirable to make some of the patches 6 somewhat longer than others, so that the mouths of the pockets 3 are at different radial positions. Furthermore, although it is preferred to provide pocket patches on all the canopy gores, it is possible to achieve most or all of the advantages of the invention by providing such patches on only a proportion of the gores and it is thus possible to add less bulk to the parachute.

It will be further understood that a downwardly facing pocket could be defined by stitching the patch 6 to the gore 7 along the lines 8 and 9 only, but better results are obtained by the arrangement shown.

I claim:

1. A parachute comprising a canopy, and a series of circumferentially arranged pockets closely adjacent the peripheral edge of said canopy on the exterior thereof, each of said pockets consisting solely of a patch which is freely foldable when the parachute is unfolded and has side edges secured to said canopy, a lower end secured to said canopy closely adjacent the peripheral edge thereof and a detached upper edge, said side edges being secured to said canopy so that the top edge between the points of securement of said side edges is slightly greater in length than the distance between such points of securement of said side edges as measured on the surface of said canopy to render the upper edge slack to enable the pocket to fully open and to be filled with water only when an area of said canopy in which said pockets are located is dragged across a body of water.

2. A parachute according to claim 1, wherein said canopy has a series of gores with one said pocket patch for each gore having a circumferential extent about equal to that of said gore.

* * * * *